Nov. 18, 1969 P. I. BONYHARD 3,479,657

THIN FILM MEMORY CIRCUIT

Filed Sept. 12, 1966 2 Sheets-Sheet 1

INVENTOR
P. I. BONYHARD
BY William H. Kamstra
ATTORNEY

Nov. 18, 1969 P. I. BONYHARD 3,479,657
THIN FILM MEMORY CIRCUIT
Filed Sept. 12, 1966 2 Sheets-Sheet 2

United States Patent Office 3,479,657

Patented Nov. 18, 1969

3,479,657

THIN FILM MEMORY CIRCUIT

Peter I. Bonyhard, Newark, N.J., assignor to Bell Telephone Laboratories, Incorporated, Murray Hill and Berkeley Heights, N.J., a corporation of New York Filed Sept. 12, 1966, Ser. No. 578,758
Int. Cl. G11b *5/00*
U.S. Cl. 340—174 11 Claims

ABSTRACT OF THE DISCLOSURE

Bit circuit current for writing in a cylindrical magnetic thin film memory after destructive readout is controlled in magnitude in accordance with a comparison between information just read out and information which is to be stored. Where bits of the two information sets differ, a bit drive current is employed which is large enough to reverse film magnetization. However, where the bits are the same, a smaller bit drive current is employed to aid the film anisotropy to restore the information readout and to do so with reduced risk of generating a hard writing of the information.

This invention relates to magnetic memory devices and particularly to access circuits adapted to write information into such memory devices.

Magnetic memory devices of the thin film type have given considerable promise in the continuing search for memory devices which make possible faster access speeds. One such memory device comprises a cylindrical magnetic film electroplated on a conductive wire substrate. A uniaxial magnetic anisotropy is established in the magnetic film which is circular about the axis of the wire substrate. The film is thus capable of having two stable magnetization states induced therein: either clockwise or counterclockwise about the axis of the wire. These two stable states conventionally represent a binary "1" and "0." Memory devices of this type have advantageously offered greater simplicity in the fabrication of memory matrices and have provided relatively large output signals during interrogation.

The information-representative magnetic states are established in a storage address of a cylindrical thin film memory element immediately upon the termination of a readout. An interrogation of a storage address is accomplished by applying a current pulse to a solenoid inductively coupled to the address segment transversely to the axis of the wire substrate. The magnetic field thus produced rotates the magnetization of the address segment from its remanent circumferential direction into a direction which is parallel to the wire axis. The wire substrate in inductively coupled to components of the film magnetization parallel to the wire circumference but not to components parallel to the wire axis. Accordingly, as the readout field reduces the circumferential component of the magnetization, an output signal voltage is induced in the wire substrate, its polarity being determined by the direction in which the readout rotation of the film magnetization occurred. The latter in turn is determined by the particular direction of the remanent magnetization about the wire substrate axis originally established in the address segment. Output signals of opposite polarity are thus generated during an interrogation of a binary "1" and "0."

When the read field is terminated, the magnetization of the address segment will rotate back to one of the two stable circumferential directions as the result of the uniaxial anisotropy. If the read field is sufficiently large, the magnetization is rotated completely into the axial direction; and when it is terminated, the magnetization may relax into either of the two stable states, regardless of its original direction. A preference for a particular direction is established by applying a clockwise or counterclockwise circumferential magnetic field to the film as the interrogating axial field is terminated. The circumferential field need only "tip" the magnetization some part of the distance toward the desired direction; the film anisotropy is then sufficient to complete the rotation. The "tipping" field is advantageously produced by applying a small current to the wire substrate itself. A writing operation in a cylindrical film memory is thus accomplished in one prior art arrangement by applying a small current of one polarity to the wire for one binary value and of the opposite polarity for the other binary value. Writing by such tipping currents is accomplished as the read current pulse on the coupled solenoid is terminated.

It is apparent from the foregoing brief introduction to the operation of a thin film memory element that the tipping current in every write operation need not be of the same magnitude. Thus, where the storage address segment of the memory element already contains the information value which it is intended to write therein, the tipping current need by only very small in view of the automatic restoration of the magnetization due to the anisotropy of the magnetic material, that is, if the rotation from its circumferential direction is not completely 90°. On the other hand, if during a write operation the information in a storage address is to be changed, the rewrite tipping field must be somewhat greater in order to overcome the tendency for the anisotropy of the material to restore the magnetization to its original circumferential direction. Theoretically, a rewrite tipping field of predetermined magnitude should fully switch the magnetization of a storage address on its first application. However, in practice it has been found that not all of the available magnetic flux of a thin film storage address is so switched on the first application of the tipping field.

This may be due to several reasons. For example, some localized regions of the magnetic material may require a field greater than the applied tipping field in order to switch due to a dispersion of magnetic properties. Also, if the magnetic medium is continuous from address segment to address segment, as is the case in cylindrical film elements, that magnetization is subjected to some fraction of the total drive field, which fraction, although insufficient to cause switching at the buffer region, does detract from the field applied to the address segment. On repeated applications of the rewrite tipping field in the same direction, however, some of the unswitched regions in the address segment finally do switch, most frequently, by the well-known phenomenon of domain wall creep. Consequently, as is well known in connection with thin film memory elements, the output voltage observed on subsequent interrogations of the same address segment is a function of the number of times that the rewrite pulses have been repeated. The greater the number of sequential rewrite operations, the "harder" the memory element may be said to be written; and the greater in magnitude will be the output signal.

Manifestly, this variation in output voltage amplitude is in itself undesirable. Of equal importance, however, is the fact that the harder the memory element has been written in one direction to represent one binary value, the greater will be the tipping fields required to rewrite the element in the opposite direction representative of the other value. A tipping field of uniform magnitude applied only once will leave regions of the address unswitched, as mentioned earlier, which regions may hinder the remainder of the magnetic material of the address segment from switching as the result of interaction, either magnetostatic or exchange. Such unswitched regions may also themselves contribute to the output voltage during interrogation. When a memory element of the thin film type is writttten hard and then is to have new and different information introduced therein by a single application of a constant magnitude write tipping field, the output voltage on subsequent interrogation of the address segment may be small or even, in an aggravated case, of the wrong polarity. Repetitive application of a tipping field in one direction when the storage address segment is already magnetized in that direction may thus leave the tipping field of the same absolute magnitude insufficient adequately to switch the segment when the direction of magnetization is to be changed.

It is accordingly one object of this invention to control the magnitude of a rewrite tipping field in thin film magnetic memory elements in accordance with the character of the information to be stored therein.

Another objection of this invention is to improve the uniformity of ouput signals in thin magnetic memory elements.

A still further object of this invention is to preclude the hard setting of a storage address segment of thin film memory elements.

It is also an object of this invention to provide a new and novel write access circuit for thin film magnetic memory systems.

The foregoing and other objects of this invention are realized in one specific illustrative embodiment thereof which comprises an information sampling circuit adapted to operate in conjunction with a magnetic memory arrangement of the cylindrical thin film type. During a readout operation of the memory in which, as discussed briefly hereinbefore, a read current pulse is applied to a selected word solenoid, the output voltage signals generated in the bit lines comprising the wire substrates themselves are sampled to determine the character of the information which is being read out. The information thus obtained is useful for two purposes: to control the access circuitry to accomplish a change in the information stored in the interrogated address or to control the access circuitry to restore the information to the address which appeared therein prior to interrogation.

If the latter operation is to be accomplished, as mentioned previously, a tipping field of only small magnitude is required at the termination of the read pulse to tip the magnetization of the address segment back to its original circumferential direction about the axis of the wire substrate. On the other hand, if the information is to be changed, a larger tipping field is required to urge the rotation of the magnetization in the opposite circumferential direction about the wire axis. Advantageously, in accordance with the principles of this invention, fields of different magnitudes are provided to meet the different magnetic conditions obtaining when information is to be restored and when it is to be changed in an interrogated address segment of the thin film memory element. Instead of applying a field which exceeds that necessary to tip a magnetization back to its original direction, and doing so on each read-write operation to result in a hard writing of the storage address, the circuitry according to this invention reduces at each write operation the magnitude of the tipping field when the interrogated information is to be restored and provides for an increase in this tipping field when the direction of the information-representative magnetization is to be reversed. As a result, the possibility of writing an address segment of the thin film hard is substantially reduced. As the flux density in an address segment remains substantially constant even after repeated interrogations and rewritings, a uniformity of output voltage signals is also advantageously achieved. A tipping field, properly determined in magnitude for switching an address segment after only a single interrogation, will then also be of sufficient magnitude to switch the magnetization of the segment after repeated interrogations and rewritings in the same direction.

It is thus a feature of this invention that the character of the information stored in a thin film memory element is sampled and then used to control the magnitude of the rewrite tipping field to be applied to the memory element, either to restore the original information to the memory element or to change the information to another binary value.

The foregoing and other objects and features of this invention will be better understood from a consideration of the detailed description of the organization and operation of an illustrative embodiment thereof which follows when taken in conjunction with the accompanying drawing in which.

Figure 1:
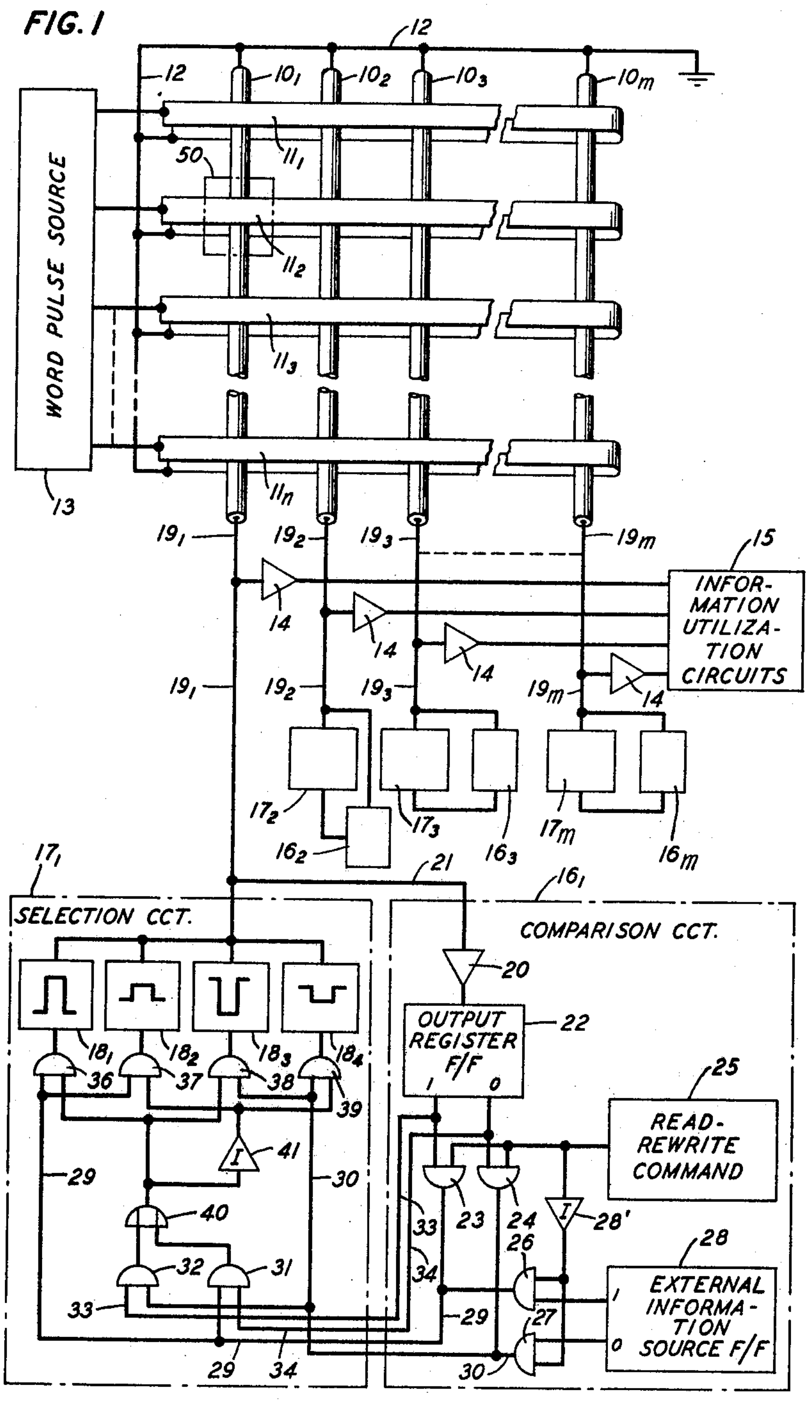
FIG. 1 depicts in simplified schematic form a typical magnetic memory array of the cylindrical thin film together with the organization of one specific write access circuit according to the principles of this invention.

A typical prior art thin film memory array shown in FIG. 1 comprises a plurality of cylindrical memory elements $10_1$, $10_2$, $10_3$ . . . and $10_m$, each of which in turn comprises an electrical conducting wire having a thin magnetic film plated or otherwise affixed thereon. Such memory elements are well known in the art, and each has a uniaxial anisotropy established in the magnetic material with the result that two stable states of magnetization are possible in the material circularly about the longitudinal axis of the conducting wire. The two stable states, either clockwise or counterclockwise about the element circumference, are thus conventionally representative of the two binary values. The elements 10 are parallelly arranged and have inductively coupled transversely thereto a plurality of flat strip solenoids $11_1$, $11_2$, $11_3$ . . . and $11_n$. The solenoids 11 pass in one direction on one side of the elements 10 and return in the opposite direction on the other side of the same elements. One termination of each of the elements 10 as well as of each of the solenoids 11 is connected to a ground bus 12. The memory array of FIG. 1 is assumed for purposes of description to be word-organized; the bit lines of the array being defined by the memory elements 10 and word lines being defined by the solenoids 11 to define therebetween an *mn* array of individual binary information storage addresses.

The solenoids 11 have their other ends connected to a source of word pulses 13. This source may comprise any circuit of a character well known in the art capable of selectively applying to the solenoids 11 read pulses in the manner to be described. The circuit 13 is ordinarily under the control of the system with which the present invention may be adapted for use; and, since the circuit 13 is readily envisioned by one skilled in the art, it is shown in block symbol form only. Each of the memory elements 10 is connected at the other end through a detection amplifier 14 to information utilization circuits 15. The latter circuits are assumed for purposes of description to comprise the ultimate user circuits of the information read out of the memory array. Since the organization of such circuits is not necessary for an understanding of this invention, they are shown in block symbol form only. Each of the memory elements 10 is connected at its other end also to what are conveniently termed, for purposes of description, a comparison circuit 16 and a selection circuit 17. The comparison circuits $16_1$, $16_2$, $16_3$ . . . and $16_m$ are thus connected to the memory elements $10_1$, $10_2$, $10_3$ . . . and $10_m$, respectively, only the first of these circuits $16_{12}$, being shown in detail in FIG. 1. The selection circuits $17_1$, $17_2$, $17_3$ . . . and $17_m$ are connected, respectively, to the same memory elements as the comparison circuits 16 and only the first selection circuit $17_1$ is shown in detail in FIG. 1.

Before describing the details of the selection circuits and comparison circuits it will be helpful to outline their functions by reviewing the operation of a cylindrical thin film memory array. In a typical case, the memory array of FIG. 1 is operated in two modes: In one mode, it is controlled to read the information out of a selected word line and rewrite the same information back into the bit addresses of the word line without change; or, in another mode, it may be controlled to read out the information from a selected word line and write a new binary word in the word line just interrogated. In the latter case, in any bit address, the binary value may be changed or it may be restored if it is the same as the binary value just interrogated. A tipping current may thus be either positive or negative, depending upon the character of the binary value to be written; and, in accordance with the principles of this invention, it may also be large or small in either polarity. Four distinct sources of tipping current are thus required in connection with a novel read-write operation of a thin film memory according to this invention. The sources of tipping current $18_1$, $18_2$, $18_3$, and $18_4$ of the selection circuit $17_1$ are shown in FIG. 1 as having their respective outputs connected directly to a conductor $19_1$ connected to the memory element $10_1$. The sources 18 may comprise any circuit adapted to generate current pulses of the magnitude and polarity indicated in the block symbols of FIG. 1, and the relative amplitude of the tipping current pulses will be considered in a description of an illustrative operation of the invention hereinafter.

The selective energization of the tipping current sources 18 is controlled by means of a logic network and the comparison circuit $16_1$ the details of which may now be considered. The conductor $19_1$ of the first memory element $10_1$ is connected to a second amplifier 20 via a conductor 21 and thence to an output register 22. It should be appreciated that in practice a single amplifier may fulfill the function of both 14 and 20. The register 22 comprises a flip-flop circuit having a binary "1" and a binary "0" output and is capable of being set and reset by positive and negative signals, respectively, generated in a memory element 10 during a readout operation. The "1" and "0" outputs of the register 22 are connected respectively to one of the inputs of each of a pair of AND gates 23 and 24, the other inputs of which gates are connected together and to a read-rewrite command signal circuit 25. The single outputs of the AND gates 23 and 24 are connected respectively to the outputs of each of a pair of AND gates 26 and 27. One input of each of the latter gates is connected to the "1" and "0" output terminals, respectively, of an external information source flip-flop 28. The other inputs of the gates 26 and 27 are connected together and to the output of an inverter 28' the input of which inverter is connected to the output of the read-rewrite command circuit 25.

Four outputs from the comparison circuit $16_1$ are carried to the selection circuit $17_1$: one from each of the common connections of the AN Dgates 23–26 and 24–27 and one directly from each of the outputs of the output register 22. The outputs from the gates 23–26 and 24–27 are carried via conductors 29 and 30 to one input each of a pair of AND gates 31 and 32, respectively. The "1" and "0" outputs of the register 22 are also carried via conductors 33 and 34 to the other inputs of the AND gates 32 and 31, respectively.

The tipping current sources 18 have associated therewith, respectively, AND gates 36, 37, 38, and 39, the output of each gate controlling the energization of its associated current source 18. The gates 36 and 37 have one of their inputs connected together and to the common connection of the AND gates 23–26 of the comparison circuit $16_1$, and the gates 38 and 39 similarly have one of their inputs connected together and to the common connection of the AND gates 24–27. The gates 36 and 38 have their other inputs connected together and to the output of an OR gate 40, and the gates 37 and 39 similarly have their other inputs connected together and to the same output of the OR gate 40 but through an inverter 41. The two-input OR gate 40 has its inputs connected, respectively, to the outputs of the AND gates 31 and 32. The details of the organization of the selection circuit $17_1$ and comparison circuit $16_1$ are to be understood as duplicated for each of the remaining selection circuits $17_2$, $17_3$ . . . and $17_m$, and comparison circuits $16_2$, $16_3$ . . . and $16_m$.

Figure 2:
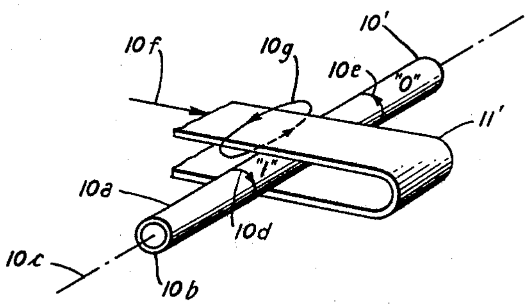
FIG. 2 depicts in simplified form a single bit storage address of a cylindrical thin film memory with which the write access circuit of this invention is advantageously adapted for use.

With the organization of one specific embodiment of a write access circuit according to the present invention thus described, illustrative operations of the circuit in conjunction with an exemplary cylindrical thin film memory may now be considered. Preliminarily, however, a detailed review of the manner in which stable magnetizations are established in a thin film memory element 10 will prove helpful in apprehending the advantages of the present invention in restoring or changing information represented by the magnetizations. A single information storage address of a cylindrical thin film memory is depicted in FIG. 2 and comprises a memory element 10' having a portion of a solenoid 11' inductively coupled thereto. The element 10' is shown in turn as comprising a thin film of magnetic material **10*a* affixed to an internal conductor substrate 10*b*. The magnetic material 10*a* has a uniaxial anisotropy established therein circumferentially about the longitudinal axis 10*c* of the conductor 10*b*. Two easy directions of magnetism are thus available in the material 10*a*: clockwise and counterclockwise about the axis 10*c*. For purposes of description it will be assumed that a clockwise magnetic flux in the material 10*a* as viewed from the near end of the element 10' is representative of a binary "1," and that a counterclockwise magnetic flux similarly viewed is representative of a binary "0." These directions are indicated in FIG. 2 by the circumferential arrows 10*d* and 10*e***, respectively.

As previously reviewed, the magnetic remanent state of the thin film element 10' is interrogated by applying a drive current pulse to the solenoid 11'. This drive current, indicated by the directional arrow **10*f*, produces a magnetic field which rotates the magnetization of the film from its remanent circumferential direction into a direction parallel to the conductor axis 10*c*. The drive field so generated and its direction are indicated by the field line 10*g* in FIG. 2. The conductor 10*b* is inductively coupled to components of the film magnetization parallel to the conductor circumference but not to the components parallel to the conductor axis 10*c*. The magnetization vector remains essentially constant in magnitude as it is rotated from one direction to another. Therefore, as the read field reduces the circumferential component of magnetization, a signal voltage is induced in the substrate conductor 10*b*. Assuming the conductor 10*c*** to be connected to an output circuit having an output terminal at the near end as viewed in FIG. 2, then the induced voltage upon the readout of a binary "1" will be in a direction to cause a positive output signal current to appear at the terminal and the readout of a binary "0" will cause a negative output signal current to appear at the terminal. Output signals of opposite polarity are thus advantageously produced on the interrogation of the storage address of FIG. 1.

When the current **10*f* and reading field are terminated, the magnetization will rotate rapidly back into one of the two stable circumferential directions as the result of the uniaxial anisotropy. If, however, the read field is limited in amplitude, it cannot rotate completely the film magnetization into the axial direction. As a result, the magnetization reverts automatically to its original stable state. On the other hand, if the reading field is large enough to rotate the magnetization completely into the axial direction, when it is terminated, the magnetization relaxes ambiguously into either direction of stable magnetization, regardless of its original direction. As a result, in a typical thin film memory operation, at the termination of the read field, a small tipping field is applied to the magnetization at the apex of its rotation in a direction to return it to whichever stable magnetic state is required to represent the desired information. Such a circumferential tipping field need only urge the magnetization a part of the way toward the required direction; the thin film anisotropy completes the return rotation. In practice, the tipping field is advantageously produced by a current applied to the conductor 10***b* of the storage address depicted in FIG. 2. In the latter arrangement, a positive tipping current applied to the near end termination of the conductor 10*b* will return a magnetization rotated as described above, back to its binary "1" representative stable direction. Similarly, a negative tipping current applied to the near end termination will change a magnetization rotated during readout as described above, to a binary "0" representative stable direction on the circumference of the material 10*a*.

It will be assumed for purposes of description that the storage address 50 defined in FIG. 1 on the memory element $10_1$ by the coupled solenoid $11_2$ has a binary "1" magnetic state present therein. It is further assumed that the binary word of which this binary value is one bit is to be read out during an exemplary read-write operation of the memory and write circuitry of FIG. 1. For the first illustrative read-write operation, the mode in which the same information read out is to be restored will be described. The illustrative operations will be described with reference to the signal timing chart of FIG. 3 in which it is assumed that each operation of the system of FIG. 1 is initiated by a timing pulse 51 occurring at the time $t_0$ provided by external circuitry, not shown, of the system in which the present invention may be adapted for use. The pulse 51 thus will control the timing of various inputs to the system to be described such as, for example, the selective application of drive pulses from the word pulse source 13 and the external information source 28 of FIG. 1. Since the generation of the timing pulses, such as the pulse 51, is well known in the art and does not comprise a function of this invention, it is mentioned here as background information only, and its source or control need not be described for an understanding of this invention.

Figure 3:
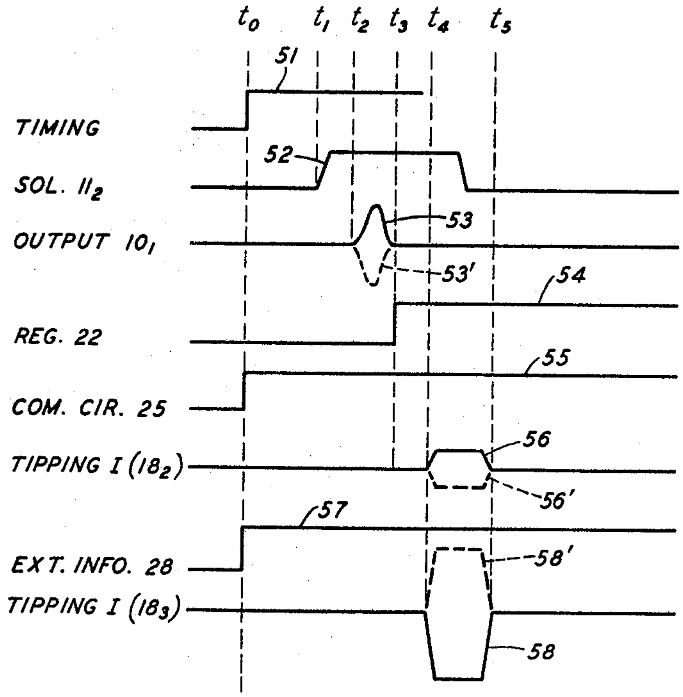
FIG. 3 is a chart showing, in idealized form, particular signal waveshapes occurring at different points within the circuit of this invention during its operations.

After a decoding delay during which the particular word address of the word line to be interrogated is determined, the word pulse source 13 is controlled to apply to the selected word solenoid $11_2$ a word drive pulse shown in the signal chart of FIG. 3 as a positive drive current 52 initiated at the time $t_1$. After normal propagation delay and the time required for the rotation of the magnetization at the storage segment of address 50 of the memory element $10_1$, an output signal will appear at the detection amplifier 14 connected to the latter memory element. Since a binary "1" is being read out of the address 50, a positive output signal will be so generated by the flux rotation and will appear at the above amplifier 14 at the time $t_2$ for subsequent transmission to the information utilization circuits 15. The "1" representative output signal is represented by the positive waveshape 53 in the chart of FIG. 3, the dashed negative waveshape 53' indicating the possible negative output of a signal representative of a binary "0." At the same time $t_2$, signals such as the waveshapes 53 or 53' will be generated in each of the other bit addresses of the word line defined by the solenoid $11_2$ and transmitted to the information utilization circuits 15. However, a description of the operation of only the address 50 will suffice for an understanding of the read out of any other bit address of the memory of FIG. 1.

At the same time $t_2$ that the output signal 53 is transmitted to the amplifier 14 of the memory element $10_1$ via the conductor $19_1$, it is also being transmitted to the amplifier 20 of the comparison circuit $16_1$ via the same conductor. The positive signal 53 is there amplified and serves subsequently to set the output register flip-flop 22 to its "1" state, if that flip-flop is not already in that state. After a short delay, the register 22 provides, at the time $t_3$, a high output potential on its "1" output represented in FIG. 3 by the waveshape 54. The high positive potential is applied via the conductor 33 to one input of the AND gate 32 of selection circuit $17_1$. Since the illustrative operation of the system assumed that the same information read out is to be restored to each of the storage addresses of the interrogated word line, the read-rewrite command circuit 25, in accordance with previous instructions, applies a positive potential, represented in the chart of FIG. 3 by the waveshape 55, to both of the inputs of the AND gates 23 and 24. The former gate is consequently enabled in accordance with its AND function; and an output is applied, via the conductor 29, to one input of the AND gate 31 of the selection circuit $17_1$.

It will be appreciated that the "0" output of the external information source 28 could at this time have a high potential thereon as a result of a previous operation. Any interference from the source 28 is prevented by the AND gates 26 and 27 when the circuit 25 is energized. Its output, which enables the gates 23 and 24 is inverted by the inverter 28' resulting in no input potential on at least one of the inputs of each of the gates 26 and 27. Source 28 is thus effectively isolated during the present operation. Neither of the other inputs of the gates 31 and 32 is enabled at this time with the result that no input is applied to either input terminal of the OR gate 40. Its resulting low output is inverted at the inverter 41, the output of which is applied to one of the inputs of each of the AND gates 37 and 39. When the output from the AND gate 23 of comparison circuit $16_1$ was applied to an input of the AND gate 31 via the conductor 29, it was also applied to one of the inputs of each of the AND gates 36 and 37. Only the AND gate 37 has both of its inputs energized at this time; and, as a result, the current source $18_2$ is energized to apply a write tipping current to the conductor $19_1$ and thence to the memory element $10_1$.

The tipping current generated by the source $18_2$ is timed to occur at the time $t_4$ sometime before the termination of the drive current 52 applied to the solenoid $11_2$ and terminates at the time $t_5$ after the termination of the drive current 52. The tipping current generated by the source $18_2$ is represented in FIG. 3 by the waveshape 56. The tipping current 56 is selected as positive in accordance with the direction of restoration in the address 50 of a binary "1," which binary value was stored therein prior to the present read-rewrite operation being described. The magnitude of the tipping current 56 is selected as relatively small in accordance with the fact of restoration per se of the same binary value. According to one feature of this invention, the binary "1" already stored in the bit address 50 is not set harder during this read-rewrite operation because the tipping current 56 is limited to a magnitude just sufficient to urge the magnetization of the address 50 back to its original stable state.

If, in the operation described in the foregoing, the storage address 50 had contained a binary "0," the comparison of the output signal with the subsequently desired content of the address and the selection of a tipping current source 18 would have been carried out in a manner similar to that just described. In that case the output transmitted along the memory element $10_1$ would be the negative output signal 53' depicted in FIG. 3. Since this signal would be generated at the same point within the memory of FIG. 1 as the signal 53, it would also occur at the time $t_2$. If the register 22 was not already set in its "0" state, the signal 53' would reset it. As a result, the high potential 54 would appear on the "0" terminal of the register 22, thereby energizing, via the conductor 34, one input of the two-input AND gate 31 of the selection circuit $17_1$. Concurrently with this energization, the read-rewrite command potential 55 from the circuit 25 of the comparison circuit $16_1$ enables the AND gate 24 to pass an output, via the conductor 30, to one input of each of the AND gates 32 and 39. Since neither of the AND gates 31 and 32 has a high potential applied to both inputs, neither is enabled; and a low potential output appears at the output of the OR gate 40. This output is inverted at the inverter 41 and an output potential thereof is applied to one input of each of the AND gates 37 and 39. The latter gate is the only one of the two having a high potential on both of its two inputs with the result that an energizing signal is passed to the tipping current source $18_4$. As indicated in the block symbol of the latter current generator, its output is a negative, relatively small, current pulse, which pulse is represented in FIG. 3 by the dashed waveshape 56'. The magnitude and polarity are thus in accord with the requirement that a binary "0" be rewritten in the address 50 when this same binary value was present in the address at its latest interrogation. Again, in view of the relatively small magnitude of the tipping current 56', the address segment of the memory element 10' is not set hard but is urged only sufficiently by the tipping current to assure its return to its prior magnetization state.

In the seocnd mode of operation of the memory system of FIG. 1 the read-rewrite command circuit 25 is not energized by the external control circuitry, not shown. As a result, a zero output appears on its output terminal connected to the inputs of the gates 23 and 24. Instead, the external information source 28 has set therein new information which is to be written into the interrogated storage address after the information signal has been read out. In this mode of operation, two possibilities exist: the information previously in a bit storage address of a word is the same as the corresponding bit of the new word being written or the information previously in a bit storage address of a word must be changed. In the former case, it is clear that tipping currents of only small relative magnitude need be applied to the memory element 10', in either polarity, depending upon the character of the binary values involved. In describing an illustrative read-write operation in the second mode, it will again first be assumed that the storage address 50 contain a binary "1" which bit must be changed to a binary "0" during the write operation.

At the application of the drive current 52 depicted in FIG. 3, a positive output signal 53 indicative of the presence of a binary "1" in the storage address 50 will again be transmitted to the amplifier 14 and thence to the information utilization circuits 15. The output signal 53 will also be transmitted via the conductor $19_1$ and conductor 21 to the amplifier 20. If the output register 22 of comparison circuit $16_1$ is not already set in a "1" state, it will be so set by the signal 53 and at the time $t_3$ a high potential is applied to one input of the AND gate 32 via the conductor 33. At this time no input to either of the AND gates 23 or 24 is supplied by the read-rewrite command circuit 25; as a result, neither of these gates is enabled. However, a high positive potential now appears at the "0" output of the external information source flip-flop 28. This potential is represented in FIG. 3 by the waveshape 57 and is passed via the AND gate 27 and the conductor 30 to the other input of the AND gate 32. It will be recalled that the AND gate 27 is enabled by the output from the inverter 28' as the result of a zero output from the circuit 25. At the same time, the signal from the AND gate 27 is also applied to one input of the AND gates 38 and 39 associated with the tipping current sources $18_3$ and $18_4$. The output of the gate 32 is transmitted to an input of the OR gate 40, the output of which in turn is applied to one input each of the AND gates 36 and 38. The inverter 41 has no output at this time and it is apparent that only the AND gate 38 has a potential applied to both of its two inputs. As a result, the tipping current source $18_3$ is energized to apply its negative, relatively large current pulse, represented in FIG. 3 by the waveshape 58, to the memory element $10_1$. This signal is in accord with the requirement that the tipping current must effect a change in the information bit stored in the address 50 and that this change is from a binary "1" to a binary "0."

If, in the alternative mode of operation, the change of information in the storage address 50 from a binary "0" to a binary "1" were required, the operative excitations of the elements of the comparison circuit $16_1$ and the selection circuit $17_1$ may be similarly traced. A negative output signal 53' is then generated in the memory element $10_1$ as the result of the application thereto of the drive current 52 depicted in FIG. 3. This negative signal 53' resets the output register 22 (if not already in the "0" state) and the output potential of the "0" output terminal is applied via the conductor 34 to one input of the AND gate 31 of the selection circuit $17_1$. The "1" output of the external information source flip-flop 28 in this case has the high positive potential 57 thereon, which potential is transmitted via the AND gate 26 and conductor 29 to other inputs of the AND gate 31. The high positive potential 57 is also applied to one of the input terminals of the AND gate 36 and one of the input terminals of the AND gate 37. The output potential from the AND gate 31 is applied to an input of the OR gate 40 from the output of which it is transmitted to the other input of the AND gate 36 and to one input of the AND gate 38. The inverter 41 at this time has no output which leaves the AND gate 36 alone enabled. Its output energizes the tipping current source $18_1$ to apply a positive, relatively large, tipping current pulse to the memory element $10_1$. This signal shown in FIG. 3 by the dashed waveshape 58', is also in accord with the requirement that the tipping current must effect a change in the information bit stored in the address 50 and that this change is from a binary "0" to a binary "1."

Should, in any bit address, the information be the same as that of the bit of the new word in the second mode of operation, the operation is similar to that described for the first mode. For example, if a binary "1" were read out of the memory element $10_1$ at the address 50 and the bit of the new word at that address were also to be a binary "1," instead of an output from the AND gate 23, an output from the AND gate 26 would be supplied from the external information source 28 output "1." The latter output would be carried via the conductor 29 to one input of the AND gate 31 and also, via the same conductor, to one input each of the AND gates 36 and 37. Since neither of the AND gates 31 or 32 is enabled, the inverter 41 output is a high potential which is applied to the other input of the AND gate 37. The output from this gate energizes the tipping current source $18_2$, the output of which is a relatively small, positive tipping current. This output signal is obviously in accord with the fact that the same binary value is to be rewritten into the address 50 and that this same binary value is a "1."

It should be noted that, in a conventional prior art memory system in both modes of operation described in the foregoing, the absolute value of the tipping current would in every case be the large of the two possible values employed in the present invention. This is the case no matter what the history of an address segment prior to a write operation. Thus, in the present invention, where the lower valued tipping current is employed on an average with equal frequency as the larger valued tipping current, not only is the hard set of an address segment avoided, but a power saving is also achieved. The values of both the large and small tipping currents are experimentally determinable with regard to the extent of easy axis dispersion of the magnetic material of the memory elements 10.

The tipping current sources 18, shown in FIG. 1 as individual current sources, in practice may manifestly comprise a single source capable of selectively providing the output currents required under the control of inputs from a selection logic network in accordance with the principles of this invention. It is further to be understood that, although this invention was described in conjunction with a magnetic memory comprising an array of cylindrical thin films, it is equally adaptable for use in conjunction with memories of other structural geometrics such as, for example, flat thin films. What has been described in accordingly considered to be only one specific illustrative embodiment of this invention and various and numerous other arrangements may be devised by one skilled in the art without departing from the spirit and scope of the invention.

What is claimed is:

1. A magnetic memory circuit comprising a magnetic thin film memory element having an easy axis and a hard axis of magnetization, said element having a remanent magnetization therein in a direction along said easy axis in accordance with stored information, inductive means for causing a rotation of said magnetization toward said hard axis, electrical conducting means coupled to said element having an output signal induced therein responsive to said rotation of a polarity indicative of said stored information, a first information register responsive to said output signal for generating a readout information signal, and means for applying a tipping magnetic field to said element to restore said magnetization to said direction along said easy axis comprising a first current source for applying a first tipping current of one polarity to said electrical conducting means of sufficient absolute magnitude only to urge said magnetization back to said direction along said easy axis, a second current source for applying a second tipping current of opposite polarity and the same absolute magnitude as said first tipping current to said electrical conducting means, means for selectively energizing said first and second current sources responsive to said readout information signal, a second information register for generating a new information signal representative of new information to be stored in said element, means for applying a tipping magnetic field to said element to switch said magnetization to the opposite direction along said easy axis comprising a third current source for applying a third tipping current of one polarity to said electrical conducting means of sufficient absolute magnitude to urge said magnetization to said opposite direction along said easy axis, a fourth current source for applying a fourth tipping current of opposite polarity from, and the same absolute magnitude as, said third tipping current to said electrical conducting means, means for selectively energizing said third and fourth current sources responsive to said new information signal, and means for selectively energizing said first and second current sources responsive to said new information signal when said new information is the same as said stored information.

2. A magnetic memory circuit as claimed in claim 1 in which said memory element comprises a cylindrical thin film affixed to the surface of said electrical conducting means, said hard axis lying along the longitudinal axis of said conducting means and said easy axis lying circumferentially around said longitudinal axis.

3. A magnetic memory circuit comprising a magnetic thin film memory element having an easy axis and a hard axis of magnetization, said element having a remanent magnetization therein in a direction along said easy axis in accordance with stored information, inductive means for causing a rotation of said magnetization toward said hard axis so that a smaller tipping magnetic field is required to restore said magnetization to said direction than to switch said magnetization to the opposite direction, electrical conducting means coupled to said element having an output signal induced therein responsive to said rotation of a polarity indicative of said stored information, a first information register responsive to said output signal for generating a readout information signal, a second information register for generating a new information signal indicative of new information to be written into said element, and means for applying tipping magnetic fields to said element to restore said magnetization to said direction along said easy axis or to switch said magnetization in the opposite direction along said axis comprising a first current source for applying a first tipping current to said electrical conducting means of sufficient magnitude only to urge said magnetization back to said direction along said easy axis, a second current source for applying a second tipping current to said electrical conducting means of sufficient magnitude to urge said magnetization to said opposite direction along said easy axis, and means responsive to said readout information signal and said new information signal for energizing said first or second current source in response to said new and readout information signals being the same or different, respectively.

4. A magnetic memory circuit comprising a magnetic thin film memory element having an easy axis and a hard axis of magnetization, said element having a remanent magnetization therein in a direction along said easy axis in accordance with stored information, electrical conducting means coupled to said element, inductive means for causing a rotation of said magnetization toward said hard axis to generate an output signal in said conducting means of a polarity as determined by the direction of said rotation, a first register means responsive to said polarity of said output signal for generating a readout information signal, a second register means for generating a new information signal, means for applying a tipping magnetic field to said element to restore said magnetization to said direction along said easy axis and to switch said magnetization in the opposite direction along said axis comprising a first and a second current source for applying to said electrical conducting means a first tipping current of a polarity and sufficient absolute magnitude only to urge said magnetization back to said direction along said easy axis and a second tipping current of a polarity opposite to that of said first tipping current and sufficient greater absolute magnitude to switch said magnetization to the opposite direction along said easy axis, respectively, selection circuit means for energizing said first current source responsive to said readout information signal alone when said stored information is restored to said memory element and for energizing said first current source responsive to both said readout information signal and said new information signal being the same, and selection circuit means for energizing said second current source responsive to both said readout information signal and said new information signal when said information in said memory element is changed.

5. A magnetic memory circuit comprising a magnetic thin film memory element having an easy axis and a hard axis a magnetization, said element being capable of having remanent magnetizations induced therein in directions along said easy axis in accordance with stored information, electrical conducting means coupled to said element, inductive means for causing a rotation of said magnetizations in opposite directions toward said hard axis to generate output signals of opposite polarity in said conducting means as determined by the direction of said rotation, a first register means responsive to said output signals for generating a first and a second readout information signal, a second register means for generating a first and a second new information signal, means for applying a tipping magnetic field to said element to restore said magnetization to the original direction along said easy axis and to switch said magnetization to the opposite direction along said easy axis comprising a first pair of current sources for applying to said electrical conducting means first tipping currents of opposite polarity and of sufficient absolute magnitude only to urge said magnetization back to said original direction along said easy axis, a second pair of current sources for applying to said electrical conducting means second tipping currents of opposite polarity and of sufficiently greater absolute magnitude than said first tipping currents to switch said magnetization to the opposite direction along said easy axis, selection circuit means for energizing one of said first pair of current sources responsive to one of said first and second readout information signals when said magnetization of said element is restored to said original direction along said easy axis and for energizing one of said second pair of current sources responsive to one of said first and second readout information signals and one of said first and second new information signals when said magnetization of said element is to be switched to the opposite direction along said easy axis, and said selection circuit means including a first and a second pair of inputs, means for applying one of said first and second readout information signals to corresponding ones of said first and second pair of inputs and means for applying one of said first and second new information signals to the same corresponding one of said second pair of inputs when said magnetization is to be restored to said original direction along said easy axis, and means for applying one of said first and second readout information signals to one of said first pair of inputs and one of said first and second new information signals to the other of said second pair of inputs when said magnetization is to be switched to the opposite direction along said easy axis.

6. A magnetic memory circuit as claimed in claim 5 also comprising means for exclusively controlling the application of said first and second readout information signals and said first and second new information signals to said second pair of inputs.

7. A magnetic memory circuit as claimed in claim 6 in which said electrical conducting means comprises a wire and said memory element comprises a cylindrical thin film affixed to the surface of said wire, said easy axis lying circumferentially around the longitudinal axis of said wire and said hard axis lying along said longitudinal axis of said wire.

8. In a thin film magnetic memory element in which bipolar output signals are generated during interrogation as the result of the rotation in either of two directions of a remanent magnetization therein from an original direction indicative of stored information, write circuit means for generating a tipping magnetic field for urgng said magnetization back to said original direction and for switching said magnetization to a direction opposite from said original direction comprising electrical conducting means coupled to said memory element, means for converting said bipolar output signals to a first and a second stored information signal representative of binary digits, input means for generating a first and second new information signal also representative of binary digits, a first current source for applying to said conducting means a tipping current of a polarity and absolute magnitude sufficient only to urge said magnetization back to said orginal direction, a second current source for applying to said conducting means a tipping current of a polarity opposite to that of said first tipping current and of an absolute magnitude greater than that of said first tipping current sufficient to switch said magnetization to a direction opposite from that of said original direction, a first selection circuit means energized responsive to one of said first stored information signals alone for energizing said first current source, a second selection circuit means energized responsive to one of said first stored information signals and a corresponding one of said new information signals for also energizing said first current source, and a third selection circuit means energized responsive to one of said first stored information signals representative of one binary digit and one of said new information signals representative of the other binary digit for energizing said second current source.

9. In a thin film magnetic memory element, write circuit means as claimed in claim 8 in which said first, second, and third selection circuit means share a common input circuit comprising a first pair of inputs and a second pair of inputs, said first and second stored information signals being applied to said first pair of inputs, respectively, and also comprising means for selectively applying said first and second stored information signals or said first and second new information signals to said second pair of inputs, respectively.

10. A magnetic memory circuit comprising a plurality of thin film magnetic memory elements, each having a uniaxial anisotropy established therein, a plurality of first electrical conducting means coupled to said memory elements and defining an array of information storage addresses thereon, each of said elements having remanent magnetizations in the addresses defined thereon in a particular stable remanent direction in accordance with stored information, means for applying a read current to a selected one of said first conducting means for causing a rotation of the magnetizations in the storage addresses of said elements defined by said selected one of said first conducting means, output means coupled to each of said memory elements for generating output signals responsive to said rotations indicative of said stored information; and a plurality of write means associated respectively with said plurality of memory elements each comprising means for converting said output signals to a first and a second stored information signal representative of binary digits, input means for generating a first and a second new information signal also representative of binary digits, a first current source for generating a tipping current of a polarity and absolute magnitude sufficient only to urge the magnetization of the associated memory element back to its original direction, a second current source for generating a tipping current of a polarity opposite to that of said first tipping current and of an absolute magnitude greater than that of said first tipping current sufficient to switch said magnetization to a direction opposite to that of said original direction, a first selection circuit means energized responsive to one of said first and second stored information signals for energizing said first current source, a second selection circuit means energized responsive to one of said first stored information signals and a corresponding one of said new information signals for also energizing said first current source, and a third selection circuit means energized responsive to one of said first stored information signals representative of one binary digit and the one of said new information signals representative of the other binary digit for energizing said second current source.

11. A magnetic memory circuit as claimed in claim 10 also comprising a plurality of a second electrical conducting means coupled to said memory elements, and means for connecting one of said first and second current sources to each of said plurality of second electrical conducting means.

References Cited

UNITED STATES PATENTS

| | | | |
|---|---|---|---|
| 3,311,893 | 3/1967 | Landell | 340—172.5 |
| 3,371,326 | 2/1968 | Fedde | 340—174 |

OTHER REFERENCES

"Magnetic Memory" by H. P. Schlaeppi, IBM Technical Disclosure Bulletin, vol. 7, No. 1, June 1964.

TERRELL W. FEARS, Primary Examiner

K. E. KROSIN, Assistant Examiner